United States Patent
Koiwai

(10) Patent No.: US 8,987,623 B2
(45) Date of Patent: Mar. 24, 2015

(54) SLIDE SWITCH FOR USE IN ELECTRONIC APPARATUS, AND ELECTRONIC APPARATUS

(75) Inventor: Hiroshi Koiwai, Tokyo (JP)

(73) Assignee: Canon Kabushiki Kaisha (JP)

( * ) Notice: Subject to any disclaimer, the term of this patent is extended or adjusted under 35 U.S.C. 154(b) by 171 days.

(21) Appl. No.: 13/558,524

(22) Filed: Jul. 26, 2012

(65) Prior Publication Data

US 2013/0026025 A1 Jan. 31, 2013

(30) Foreign Application Priority Data

Jul. 28, 2011 (JP) ................................. 2011-165583

(51) Int. Cl.
| | | |
|---|---|---|
| H01H 15/02 | (2006.01) | |
| G03B 17/04 | (2006.01) | |
| H01H 15/10 | (2006.01) | |
| G03B 17/02 | (2006.01) | |
| G03B 19/12 | (2006.01) | |

(52) U.S. Cl.
CPC ............... *G03B 17/04* (2013.01); *H01H 15/02* (2013.01); *H01H 15/10* (2013.01); *G03B 17/02* (2013.01); *G03B 19/12* (2013.01); *G03B 2217/002* (2013.01)
USPC ....................................................... 200/548

(58) Field of Classification Search
USPC ................... 200/536, 547, 548, 551
See application file for complete search history.

(56) References Cited

U.S. PATENT DOCUMENTS

| | | | | |
|---|---|---|---|---|
| 4,441,000 A | * | 4/1984 | Suwa ............................. | 200/548 |
| 4,492,828 A | * | 1/1985 | Martinez et al. .............. | 200/5 R |
| 7,208,692 B2 | * | 4/2007 | Yamaguchi .................... | 200/547 |

FOREIGN PATENT DOCUMENTS

| | | |
|---|---|---|
| CN | 1988089 A | 6/2007 |
| CN | 101131900 A | 2/2008 |
| JP | 05-034775 A | 2/1993 |
| JP | 2005-267929 A | 9/2005 |

OTHER PUBLICATIONS

Chinese Office Action cited in Chinese counterpart application No. CN2012102642225, dated May 6, 2014. English translation provided.

* cited by examiner

*Primary Examiner* — Renee Luebke
*Assistant Examiner* — Lheiren Mae A Caroc
(74) *Attorney, Agent, or Firm* — Rossi, Kimms & McDowell LLP

(57) ABSTRACT

A slide switch capable of enhancing the accuracy of detecting a slide operation position of a slide lever and the operability of the slide lever without increasing the number of components and an installation space for the slide switch. An elastically-deformable click portion is disposed on a line passing through the center of a slide shaft of the slide lever and extending in a sliding direction in which the slide lever slides, moves integrally with the slide lever, and gets over a convex portion formed in a base member to generate a click force. In an accommodation space which accommodates the click portion and a plurality of armature portions, the click portion and one armature portion of the plurality of armature portions are separated from each other by a first partition, and the click portion and the other armature portion are separated from each other by a second partition.

16 Claims, 11 Drawing Sheets

SLIDE SWITCH FOR USE IN ELECTRONIC APPARATUS, AND ELECTRONIC APPARATUS

BACKGROUND OF THE INVENTION

1. Field of the Invention

The present invention relates to a slide switch for use in an electronic apparatus such as a digital camera, and an electronic apparatus having the slide switch.

2. Description of the Related Art

Examples of a slide switch for use in an electronic apparatus such as a digital camera include one having a slide lever, a click portion that gives a user a click feel when the slide lever is slid, and armature portions for detecting a slide operation position of the slide lever.

For such a slide switch, there has been proposed a technique that prevents dirt or the like including lubricating oil produced in the click portion from becoming attached to the armature portions so as to prevent a slide operation position of the slide lever from being incorrectly detected (Japanese Laid-Open Patent Publication (Kokai) No. 2005-267929).

There has also been proposed a technique that disposes the click portion parallel to a direction in which the slide lever slides so as to enable a click feel of the slide lever to be imparted in a direction along the sliding direction when the slide lever is slid, thus enhancing operability (Japanese Laid-Open Patent Publication (Kokai) No. H05-034775).

However, according to Japanese Laid-Open Patent Publication (Kokai) No. 2005-267929 mentioned above, dirt produced in each of a plurality of armature portions may become attached to the adjacent armature portion and cause poor contact between the armature portions and signal patterns, which result in a decrease in the accuracy of detecting a slide operation position of the slide lever.

Also, according to Japanese Laid-Open Patent Publication (Kokai) No. H05-034775 mentioned above, a switch unit constructed by combining a switch lever, a case, a soldering terminal, and so on into one unit is required, which leads to increases in the number of components and an installation space for the slide switch.

Moreover, according to Japanese Laid-Open Patent Publication (Kokai) No. H05-034775 mentioned above, because the click portion is disposed parallel to the direction in which the slide lever slides, a counterforce of a click force generated by a sliding operation urges the slide lever in a rotational direction. As a result, a user who is given a click feel when sliding the slide lever has a feeling of strangeness, and the operability of the slide lever deteriorates.

SUMMARY OF THE INVENTION

The present invention provides a slide switch capable of enhancing the accuracy of detecting a slide operation position of a slide lever and the operability of the slide lever without increasing the number of components and an installation space for the slide switch, as well as an electronic apparatus having the slide switch.

Accordingly, a first aspect of the present invention provides a slide switch comprising an operation member, a base member configured to be mounted on an outer cover of an electronic apparatus and guide the operation member such that the operation member can move in a sliding direction, an elastically-deformable click portion configured to be disposed on a line passing through a center of the operation member and extending in the sliding direction, move integrally with the operation member, and capable of getting over a convex portion formed in the base member to generate a click force, a plurality of armature portions configured to be movable integrally with the operation member and disposed in such a manner as to sandwich the click portion in a direction of a width of the base member which is perpendicular to the sliding direction of the operation member, and a substrate configured to have signal patterns for detecting contact positions of the plurality of armature portions in the sliding direction and be fixed to the base member to form an accommodation space between the substrate and the base member, the accommodation space accommodating the click portion and the plurality of armature portions such that the click portion and the plurality of armature portions can move in the sliding direction, wherein in the accommodation space, the click portion and one armature portion of the plurality of armature portions are separated from each other by a first partition, and the click portion and the other armature portion of the plurality of armature portions are separated from each other by a second partition.

Accordingly, a second aspect of the present invention provides an electronic apparatus having a slide switch comprising a slide switch as described above and a controller configured to perform control to switch actions of the electronic apparatus according to an operation position of the slide switch.

According to the present invention, the accuracy of detecting a slide operation position of a slide lever and the operability of the slide lever can be enhanced without increasing the number of components and an installation space for the slide switch.

Further features of the present invention will become apparent from the following description of exemplary embodiments (with reference to the attached drawings).

DESCRIPTION OF THE EMBODIMENTS

A description will now be given of an exemplary embodiment of the present invention with reference to the drawings.

Figure 1:
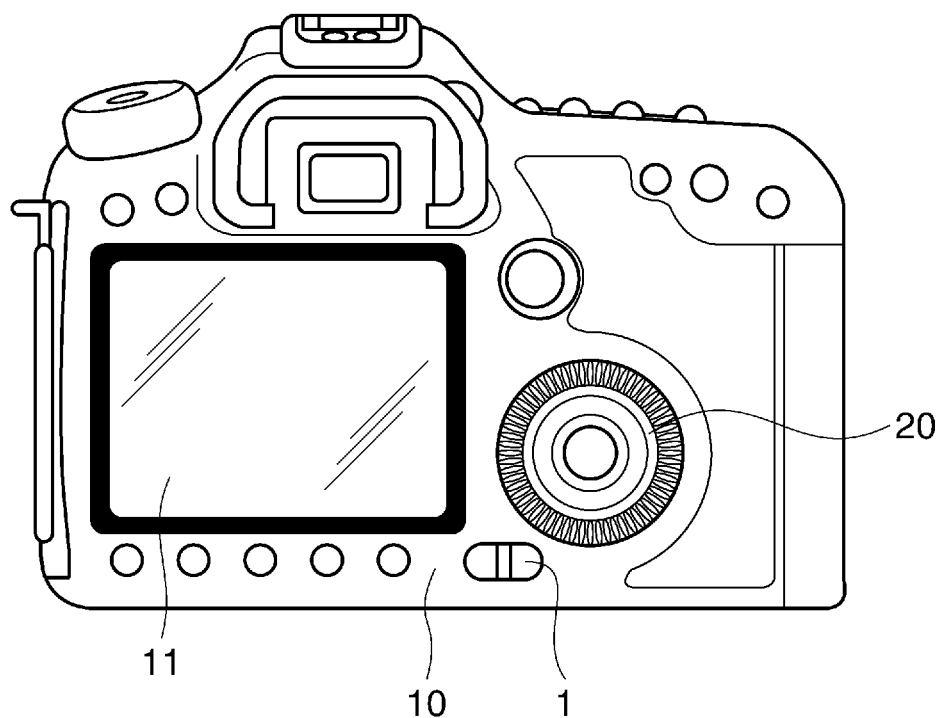
FIG. 1 is a view showing a digital camera having a slide switch, which is an exemplary embodiment of an electronic apparatus according to the present invention, as seen from behind.

FIG. 1 is a rear view showing a digital camera having a slide switch, which is an exemplary embodiment of an electronic apparatus according to the present invention.

As shown in FIG. 1, an outer cover 10 on a rear side of the digital camera according to the present embodiment is equipped with a display 11 such as an LCD, an operation dial 20, and a slide lever 1 of the slide switch.

It should be noted that in the present embodiment, when the slide lever 1 is in a first operation position, to be described later, a controller of the digital camera accepts a command operation of the operation dial 20. When the slide lever 1 is in a second operation position, to be described later, the controller of the digital camera performs control so as not to accept a command operation of the operation dial 20.

Namely, the controller of the digital camera performs control to switch actions of the digital camera according to an operation position of the slide lever 1. Here, the slide lever 1 corresponds to an exemplary operation member of the present invention.

Figure 2:
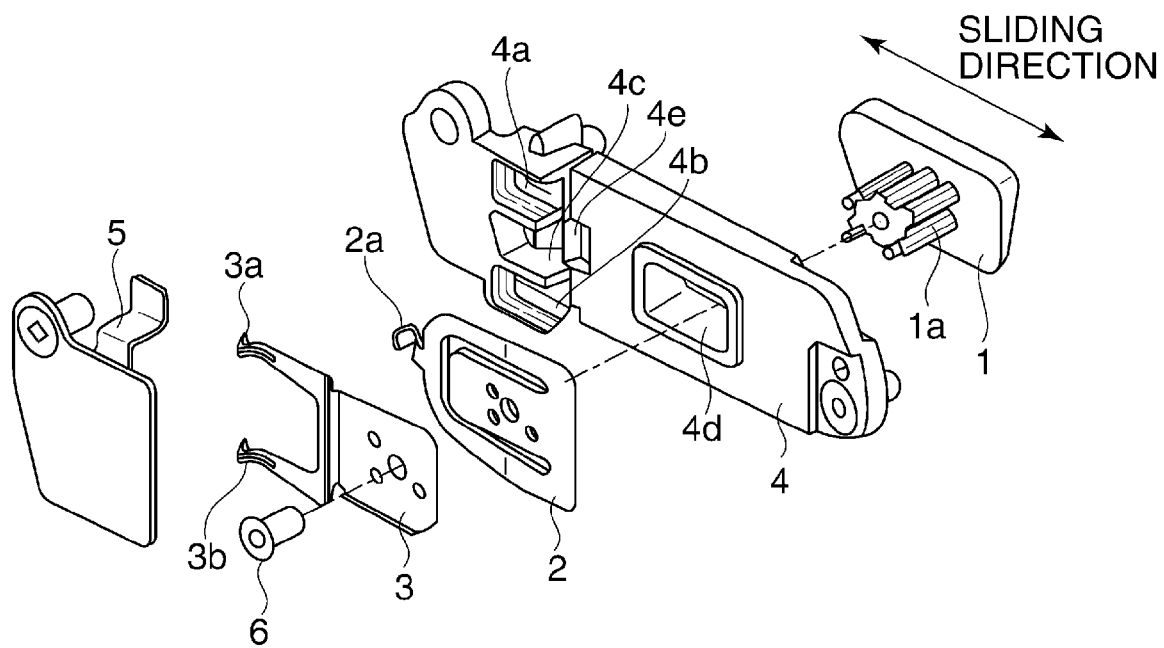
FIG. 2 is an exploded perspective view showing the slide switch.
Figure 3:
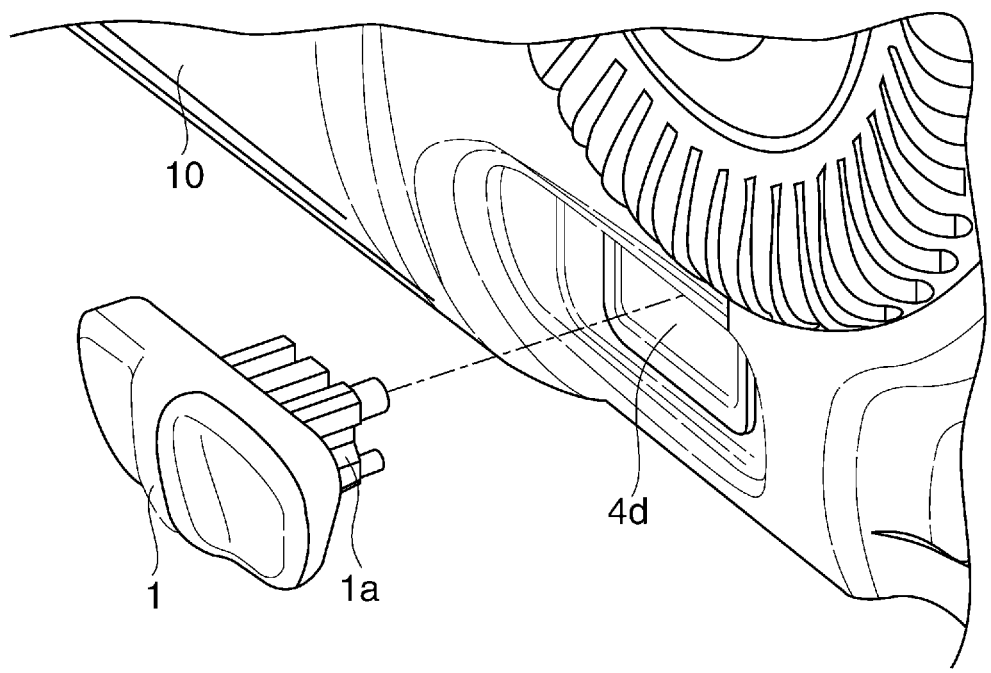
FIG. 3 is a perspective view showing a state before a slide shaft of the slide lever is inserted into a slide hole of a base member.

FIG. 2 is an exploded perspective view showing the slide switch, and FIG. 3 is a perspective view showing a state before a slide shaft 1a of the slide lever 1 is inserted into a guide hole 4d of a base member 4.

As shown in FIG. 2, the slide switch has the slide lever 1, a click member 2, an armature member 3, the base member 4, and a substrate 5.

As shown in FIG. 3, the slide shaft 1a provided in a manner protruding from a rear surface of the slide lever 1 is inserted into the guide hole 4d of the base member 4 mounted on the outer cover 10 from outside the digital camera.

After the insertion, the click member 2 and the armature member 3 are fastened to a distal end of the slide shaft 1a via a screw 6 or the like.

As a result, the slide lever 1 is guided movably in a horizontal direction as viewed in FIG. 1 along the guide hole 4d of the base member 4 with the slide shaft 1a moving in unison with the click member 2 and the armature member 3.

Figure 4A:
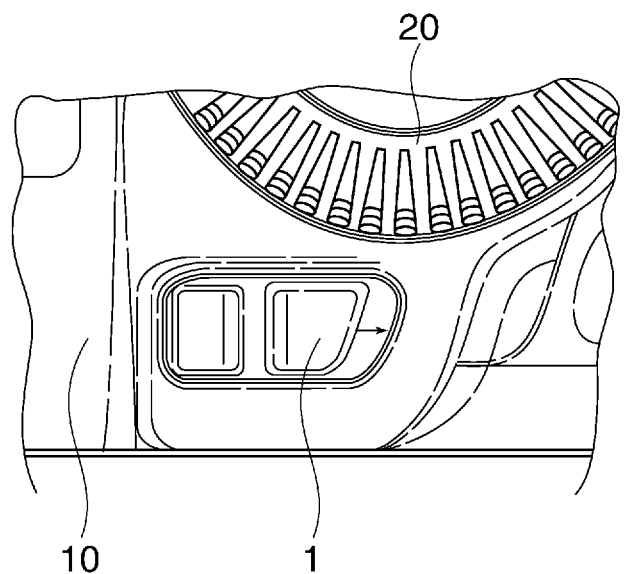
FIG. 4A is a partially enlarged view of FIG. 1 showing a state in which the slide lever is in a first operation position.
Figure 4B:
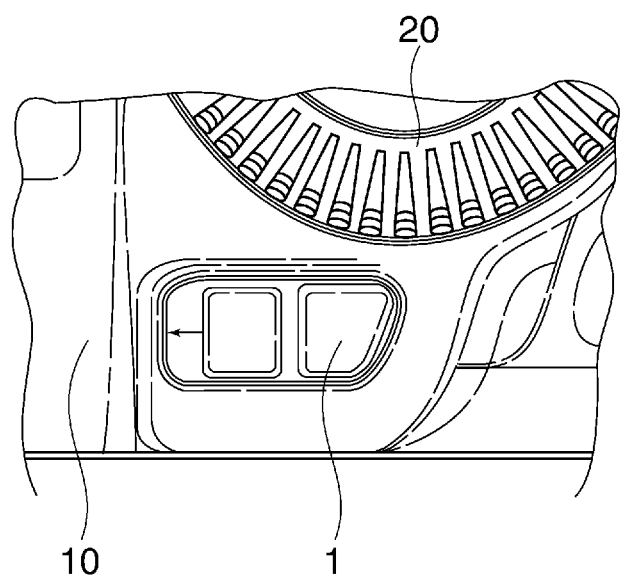
FIG. 4B is a partially enlarged view of FIG. 1 showing a state in which the slide lever is in a second operation position.

FIG. 4A is a partially enlarged view of FIG. 1 showing a state in which the slide lever 1 is in the first operation position, and FIG. 4B is a partially enlarged view of FIG. 1 showing a state in which the slide lever 1 is in the second operation position.

As shown in FIGS. 4A and 4B, the slide lever 1 is capable of sliding between the first operation position shown in FIG. 4A and the second operation position shown in FIG. 4B.

Figure 5A:
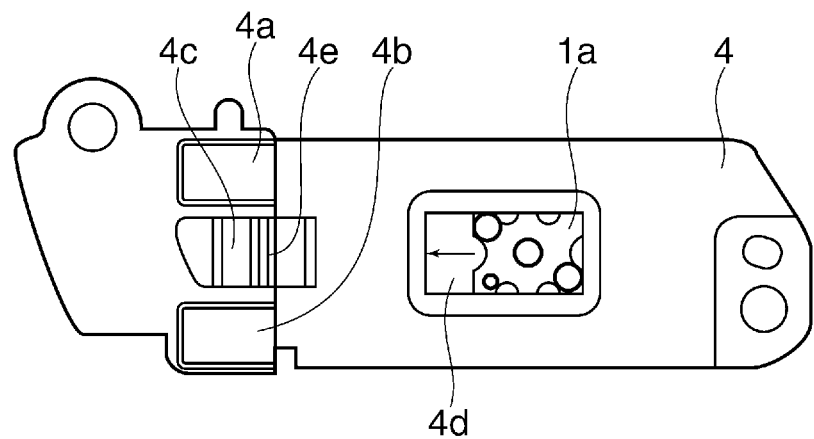
FIG. 5A is a view showing the slide switch as viewed from the rear thereof of FIG. 4A when the slide lever is in the first operation position.
Figure 5B:
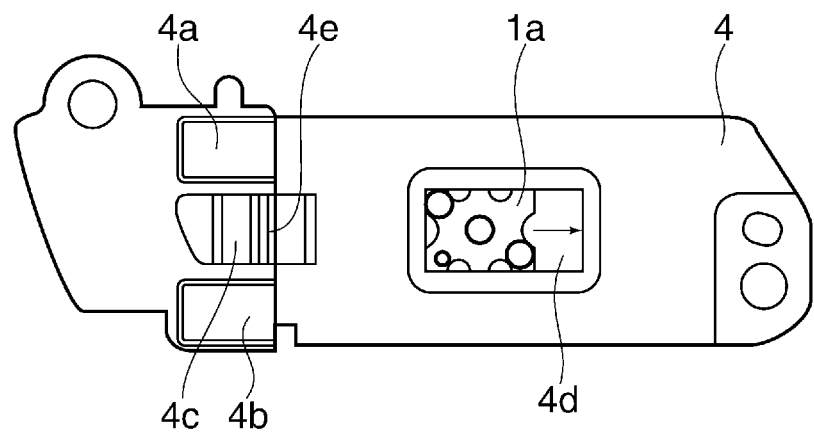
FIG. 5B is a view showing the slide switch as viewed from the rear thereof of FIG. 4B when the slide lever is in the second operation position.

FIG. 5A is a view showing the slide switch as viewed from the rear of FIG. 4A when the slide lever 1 is in the first operation position, and FIG. 5B is a view showing the slide switch as viewed from the rear of FIG. 4B when the slide lever 1 is in the second operation position. It should be noted that for the convenience of explanation, the outer cover 10, the click member 2, the armature member 3, and the substrate 5 are not shown in FIGS. 5A and 5B.

As shown in FIGS. 5A and 5B, concave portions 4a, 4b, and 4c are formed on a rear side of the base member 4 and at locations away from the guide hole 4d in a direction in which the slide lever 1 slides from the first operation position to the second operation position (a direction indicated by an arrow in FIG. 5A).

The concave portions 4a, 4b, and 4c are placed side by side in the direction of the width of the base member 4, which is perpendicular to the direction in which the slide lever 1 slides. The concave portion 4c is disposed in the center, and the concave portions 4a and 4b are disposed in such a manner as to sandwich the concave portion 4c.

Openings of the concave portions 4a, 4b, and 4c in the direction of the plate thickness of the base member 4 are closed by the substrate 5 fixed to the base member 4, and portions of the concave portions 4a, 4b, and 4c which face the guide hole 4d are opened.

The concave portion 4c is provided with a convex portion 4e with which, when the slid lever 1 is slid, a click portion 2a of the click member 2 gets over through elastic deformation to produce a click force.

Figure 6A:
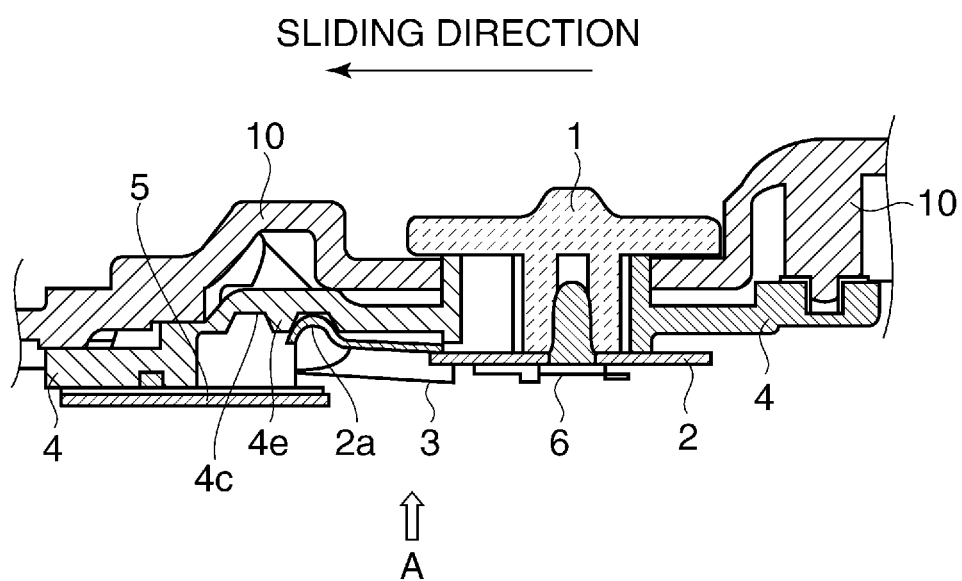
FIG. 6A is a cross-sectional view showing the slide switch taken in the sliding direction when the slide lever is in the first operation position.
Figure 6B:
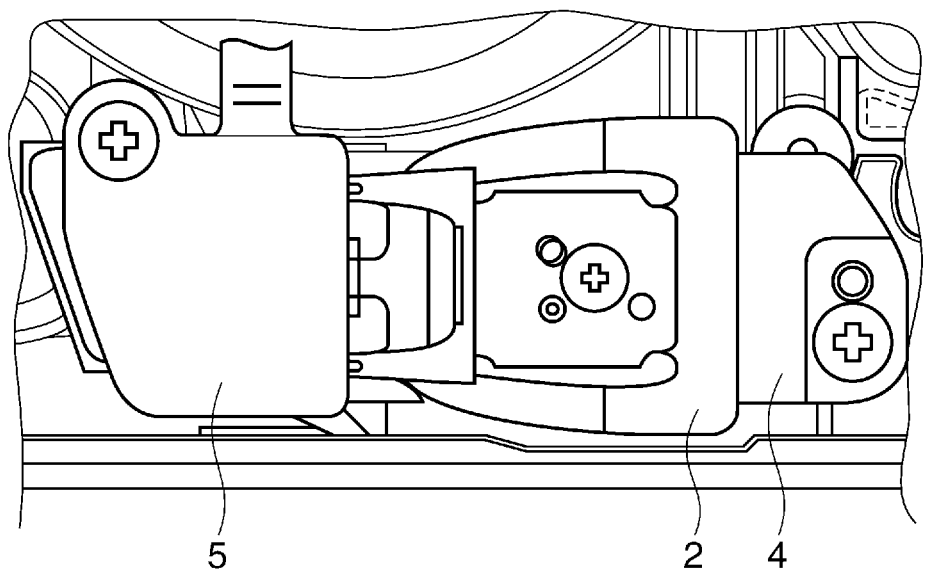
FIG. 6B is a view taken from a direction indicated by an arrow A in FIG. 6A.
Figure 7A:
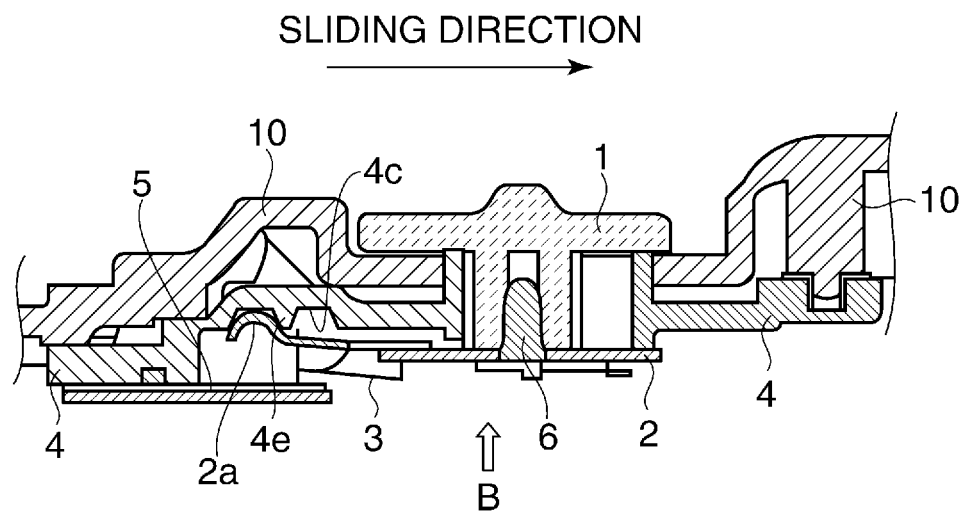
FIG. 7A is a cross-sectional view showing the slide switch taken in the sliding direction when the slide lever is in the second operation position.

FIG. 6A is a cross-sectional view showing the slide switch taken in the sliding direction when the slide lever 1 is in the first operation position, and FIG. 6B is a view taken from a direction indicated by an arrow A in FIG. 6A. FIG. 7A is a cross-sectional view showing the slide switch taken in the sliding direction when the slide lever 1 is in the second operation position, and FIG. 7B is a view taken from a direction indicated by an arrow B in FIG. 7A.

Figure 7B:
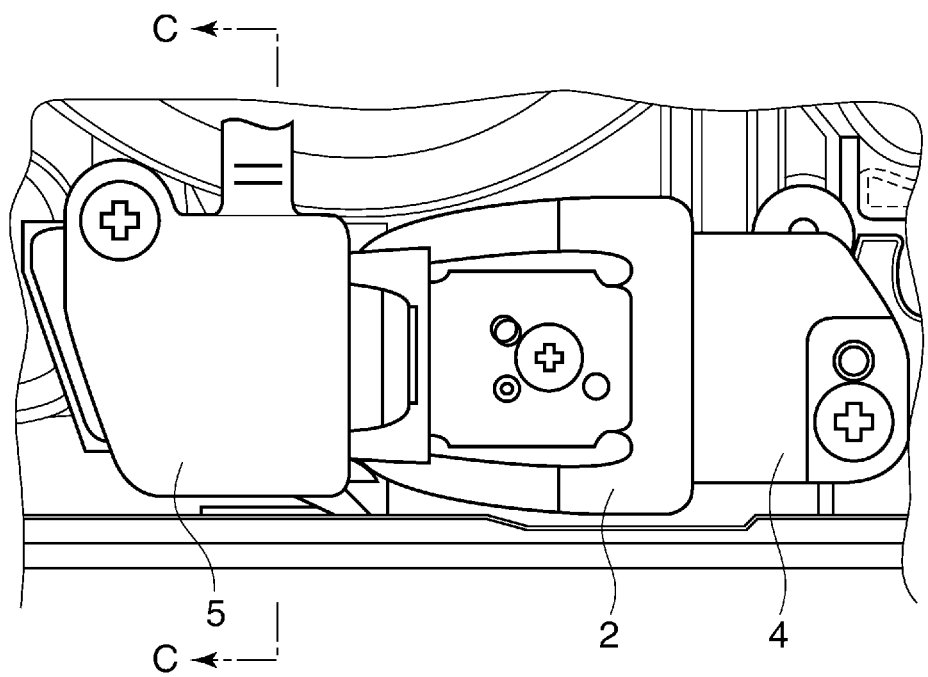
FIG. 7B is a view taken from a direction indicated by an arrow B in FIG. 7A.

When the slide lever 1 is slid from the first operation position shown in FIGS. 6A and 6B toward the second operation position shown in FIGS. 7A and 7B, the click portion 2a of the click member 2 gets over the convex portion 4e of the base member 4 and is held in the concave portion 4c.

When the click portion 2a gets over the convex portion 4e of the base member 4, the click portion 2a becomes elastically deformed, which causes a counterforce in a direction opposite to the sliding direction to be transmitted to the slide lever 1, and this counterforce acts as a click force to give a user a click feel.

Likewise, when the slide lever 1 is slid from the second operation position shown in FIGS. 7A and 7B toward the first operation position shown in FIGS. 6A and 6B, the user is given a click feel in the same manner.

Here, in the present embodiment, the click portion 2a of the click member 2 is disposed on a line passing through substantially the center of the slide shaft 1a of the slide lever 1 and extending in the sliding direction, and this enables a click force to be imparted only in the sliding direction to the user. It should be noted that an area where the click portion 2a of the click member 2 and the convex portion 4e of the base member 4 are in abutment with each other is coated with a lubricant such as grease so as to reduce sliding resistance and abrasion.

Figure 8:
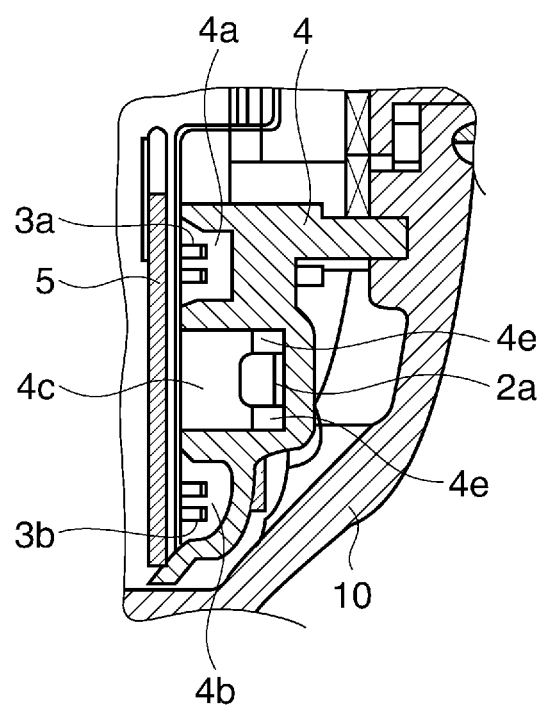
FIG. 8 is a cross-sectional view taken along line C-C of FIG. 7B.
Figure 9A:
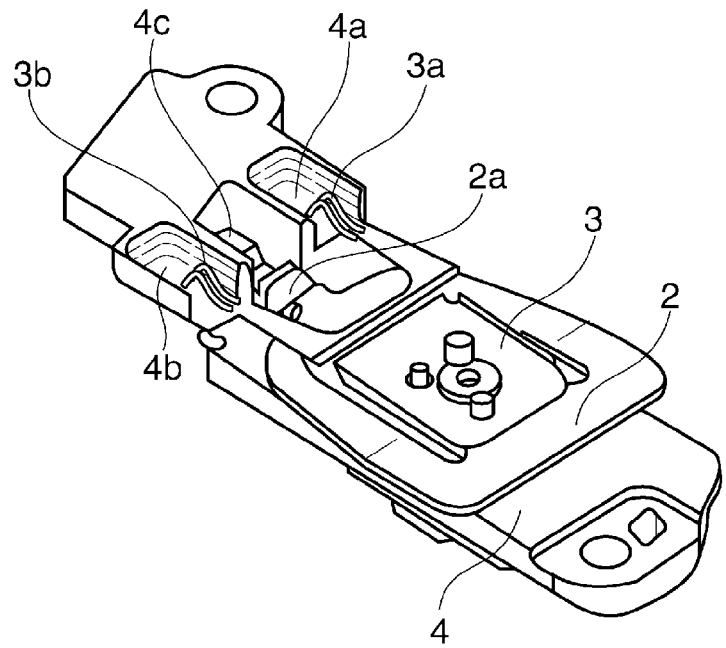
FIG. 9A is a perspective view showing the slide switch as viewed from the rear thereof when the slide lever is in the first operation position.
Figure 9B:
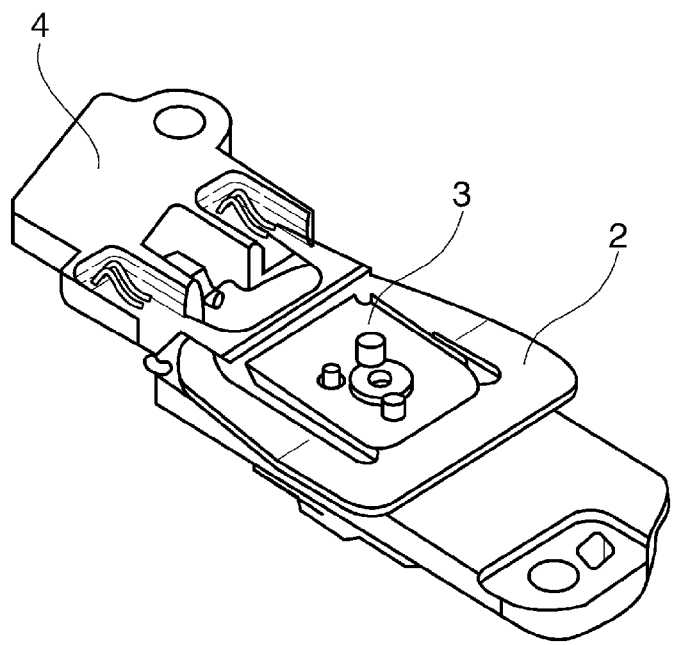
FIG. 9B is a perspective view showing the slide switch as viewed from the rear thereof when the slide lever is in the second operation position.

FIG. 8 is a cross-sectional view taken along line C-C of FIG. 7B, FIG. 9A is a perspective view showing the slide switch as viewed from the rear thereof when the slide lever 1 is in the first operation position, and FIG. 9B is a perspective view showing the slide switch as viewed from the rear thereof when the slide lever 1 is in the second operation position. It should be noted that in FIGS. 9A and 9B, the substrate 5 is not shown.

As shown in FIGS. 8, 9A, and 9B, irrespective of an operation position of the slide lever 1, the click portion 2a of the click member 2 is disposed in the concave portion 4c of the base member 4, and armature portions 3a and 3b of the armature member 3 are disposed in the concave portions 4a and 4b, respectively, of the base member 4.

Thus, an accommodation space that accommodates the click portion 2a and the armature portions 3a and 3b such that they can move in the sliding direction is formed between the concave portions 4a, 4b, and 4c of the base member 4 and the substrate 5.

In the above accommodation space, the click portion 2a and one armature portion 3a of the armature member 3 are separated from each other by a first partition between the concave portion 4c and the concave portion 4a. Also, the click portion 2a and the other armature portion 3b of the armature member 3 are separated from each other by a second partition between the concave portion 4c and the concave portion 4b.

Figure 10A:
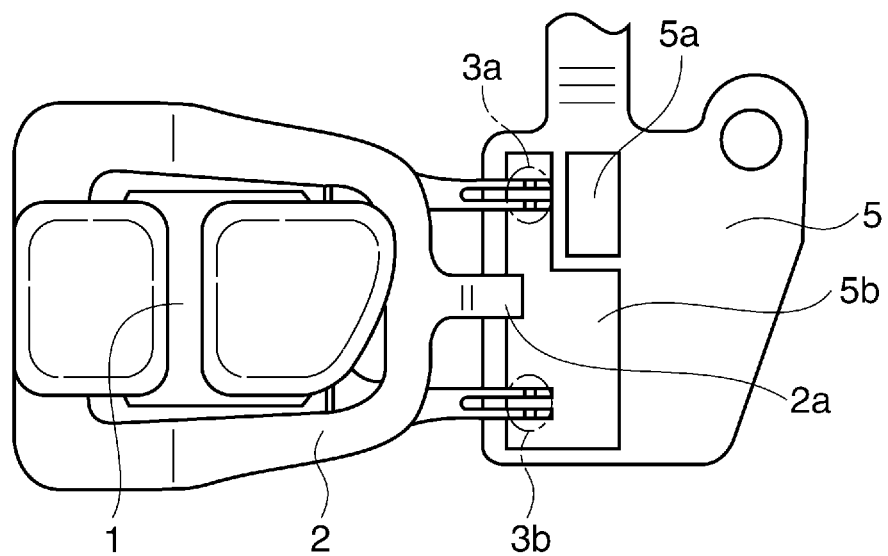
FIG. 10A is a view showing the relationship between armature portions of an armature member and signal patterns of a substrate when the slide lever is in the first operation position.
Figure 10B:
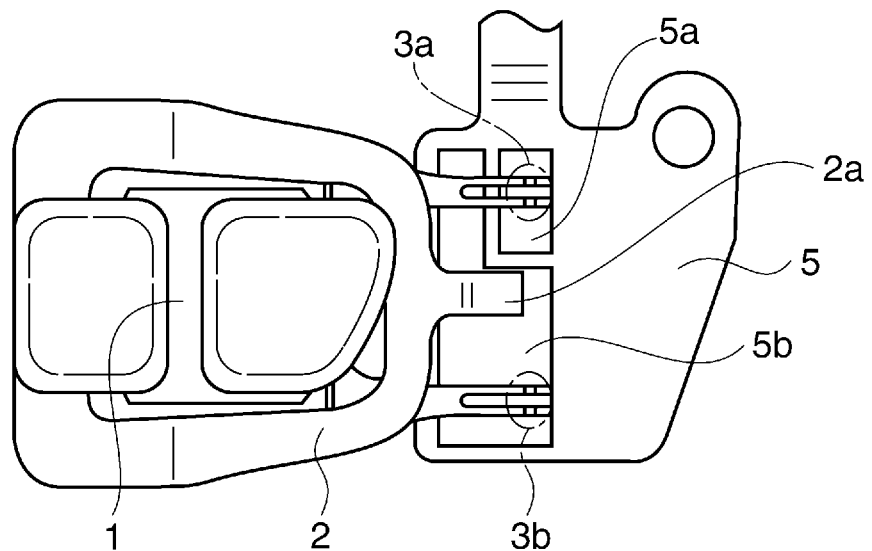
FIG. 10B is a view showing the relationship between the armature portions of the armature member and the signal patterns of the substrate when the slide lever is in the second operation position.

FIG. 10A is a view showing the relationship between the armature portions 3a and 3b of the armature member 3 and signal patterns 5a and 5b of the substrate 5 when the slide lever 1 is in the first operation position. FIG. 10B is a view showing the relationship between the armature portions 3a and 3b of the armature member 3 and the signal patterns 5a and 5b of the substrate 5 when the slide lever 1 is in the second operation position.

As shown in FIGS. 10A and 10B, the signal pattern 5a and the signal pattern 5b for detecting contact positions of the armature portions 3a and 3b in the sliding direction are each formed on the substrate 5, and the signal pattern 5a and the signal pattern 5b are each electrically connected to the controller, not shown, of the camera.

When the slide lever 1 is in the first operation position shown in FIG. 10A, both the armature portions 3a and 3b of the armature member 3 come into contact with the signal pattern 5b.

At this time, the signal pattern 5a and the signal pattern 5b are brought out of electrical conduction via the armature member 3, and the controller determines that the slide lever 1 is in the first operation position and performs control so as to accept a command operation of the operation dial 20.

When the slide lever 1 is slid from the first operation position to the second operation position shown in FIG. 10B, the armature portion 3a of the armature member 3 comes into contact with the signal pattern 5a, and the armature portion 3b of the armature member 3 comes into contact with the signal pattern 5b.

At this time, the signal pattern 5a and the signal pattern 5b are brought into electrical conduction via the armature member 3, and the controller determines that the slide lever 1 is in the second operation position and performs control so as not to accept a command operation of the operation dial 20.

This can prevent settings on the camera from being changed by the user carelessly rotating the operation dial 20.

As described above, in the present embodiment, the click portion 2a of the click member 2 is disposed on the line passing through substantially the center of the slide shaft 1a of the slide lever 1 and extending in the sliding direction.

As a result, the slide lever 1 is not urged in a rotational direction by a counterforce of a click force when a slide operation is performed, and a click force can be imparted only in the sliding direction to the user, so that the operability of the slide lever 1 can be enhanced.

Moreover, in the present embodiment, the click portion 2a and one armature portion 3a of the armature member 3 are separated from each other by the first partition between the concave portion 4c and the concave portion 4a, and the click portion 2a and the other armature portion 3b of the armature member 3 are separated from each other by the second partition between the concave portion 4c and the concave portion 4b.

Therefore, even when the convex portion 4e and the click portion 2a are repeatedly slid in contact with each other, no abrasion powder and lubricant fly to the armature portions 3a and 3b. Thus, poor contact between the signal patterns 5a and 5b of the substrate 5 and the armature portions 3a and 3b can be avoided, and the accuracy of detecting a slide operation position of the slide lever 1 can be enhanced.

Moreover, in the present embodiment, a switch unit constructed by combining a switch lever, a case, a solder terminal, and so on into one unit is not required, and hence increases in the number of components and a mounting space for the slide switch can be avoided.

Although in the embodiment described above, the click portion 2a and the armature portions 3a and 3b are provided in different members, this is not limitative, but the click portion 2a and the armature portions 3a and 3b may be provided in the same member.

Figure 11:
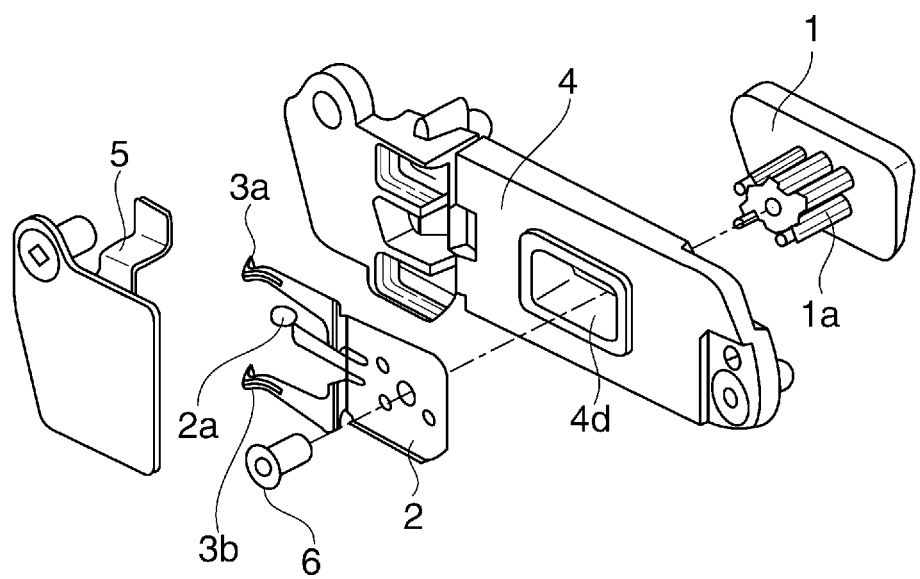
FIG. 11 is an exploded perspective view showing a variation of the slide switch.

For example, as shown in FIG. 11, the armature portions 3a and 3b may be formed integrally with the click member 2 having the click portion 2a.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-165583 filed Jul. 28, 2011, which is hereby incorporated by reference herein in its entirety.

What is claimed is:

1. A slide switch comprising:
an operation member configured to have a slide shaft perpendicularly protruding with respect to a sliding direction;
a base member configured to be mounted on an outer cover of an electronic apparatus and guide the operation member such that the operation member can move in the sliding direction;
an elastically-deformable click force generating portion configured to be disposed on a line passing through a center of the slide shaft and extending in the sliding direction, move integrally with the operation member, and capable of getting over a convex portion formed in the base member to generate a click force;
a plurality of armature portions configured to be movable integrally with the operation member and disposed in such a manner as to sandwich the click force generating portion in a direction of a width of the base member which is perpendicular to the sliding direction of the operation member; and
a substrate configured to have signal patterns for detecting contact positions of the plurality of armature portions in the sliding direction and be fixed to the base member to form an accommodation space between the substrate and the base member, the accommodation space accommodating the click force generating portion and the plurality of armature portions such that the click force generating portion and the plurality of armature portions can move in the sliding direction, wherein in the accommodation space, the click force generating portion and one armature portion of the plurality of armature portions are separated from each other by a first partition, and the click force generating portion and the other armature portion of the plurality of armature portions are separated from each other by a second partition.

2. The slide switch according to claim 1, further comprising:
- a click force generating member configured to be fixed to the operation member and have the click force generating portion formed therein; and
- an armature member configured to be fixed to the operation member and have the plurality of armature portions formed therein.

3. The slide switch according to claim 1, wherein the click force generating portion and the plurality of armature portions are formed in the same member.

4. An electronic apparatus, comprising:
a slide switch; and
a controller configured to perform control to switch actions of the electronic apparatus according to an operation position of the slide switch, the slide switch comprising:
- an operation member configured to have a slide shaft perpendicularly protruding with respect to a sliding direction;
- a base member configured to be mounted on an outer cover of an electronic apparatus and guide the operation member such that the operation member can move in the sliding direction;
- an elastically-deformable click force generating portion configured to be disposed on a line passing through a center of the slide shaft and extending in the sliding direction, move integrally with the operation member, and capable of getting over a convex portion formed in the base member to generate a click force;
- a plurality of armature portions configured to be movable integrally with the operation member and disposed in such a manner as to sandwich the click force generating portion in a direction of a width of the base member which is perpendicular to the sliding direction of the operation member; and
- a substrate configured to have signal patterns for detecting contact positions of the plurality of armature portions in the sliding direction and be fixed to the base member to form an accommodation space between the substrate and the base member, the accommodation space accommodating the click force generating portion and the plurality of armature portions such that the click force generating portion and the plurality of armature portions can move in the sliding direction, wherein in the accommodation space, the click force generating portion and one armature portion of the plurality of armature portions are separated from each other by a first partition, and the click force generating portion and the other armature portion of the plurality of armature portions are separated from each other by a second partition.

5. The slide switch according to claim 1, further comprising a lubricant disposed between the click force generating portion and the convex portion.

6. The electronic apparatus according to claim 4, further comprising:
- a click force generating member configured to be fixed to the operation member and have the click force generating portion formed therein; and
- an armature member configured to be fixed to the operation member and have the plurality of armature portions formed therein.

7. The electronic apparatus according to claim 4, wherein the click force generating portion and the plurality of armature portions are formed in the same member.

8. The electronic apparatus according to claim 4, further comprising a lubricant disposed between the click force generating portion and the convex portion.

9. A slide switch comprising:
- an operation member configured to have a slide shaft perpendicularly protruding with respect to a sliding direction;
- a base member configured to be mounted on an outer cover of an electronic apparatus and guide the operation member such that the operation member can move in the sliding direction;
- an elastically-deformable click force generating portion configured to be disposed on a line passing through a center of the slide shaft and extending in the sliding direction, move integrally with the operation member, and capable of getting over a convex portion formed in the base member to generate a click force;
- a plurality of armature portions configured to be movable integrally with the operation member and disposed in such a manner as to sandwich the click force generating portion in a direction of a width of the base member which is perpendicular to the sliding direction of the operation member; and
- a substrate configured to have signal patterns for detecting contact positions of the plurality of armature portions in the sliding direction,
wherein the substrate is fixed to the base member such that a plurality of accommodation spaces between the substrate and the base member are provided,
wherein the respective accommodation spaces are separated from each other,
wherein the click force generating portion and the plurality of armature portions are accommodated in the plurality of accommodation spaces respectively such that the click force generating portion and the plurality of armature portions can move in the sliding direction.

10. The slide switch according to claim 9, further comprising:
- a click force generating member configured to be fixed to the operation member and have the click force generating portion formed therein; and
- an armature member configured to be fixed to the operation member and have the plurality of armature portions formed therein.

11. The slide switch according to claim 9, wherein the click force generating portion and the plurality of armature portions are formed in the same member.

12. The slide switch according to claim 9, further comprising a lubricant disposed between the click force generating portion and the convex portion.

13. An electronic apparatus, comprising:
a slide switch; and a controller configured to perform control to switch actions of the electronic apparatus according to an operation position of the slide switch, the slide switch comprising:

an operation member configured to have a slide shaft perpendicularly protruding with respect to a sliding direction;

a base member configured to be mounted on an outer cover of an electronic apparatus and guide the operation member such that the operation member can move in the sliding direction;

an elastically-deformable click force generating portion configured to be disposed on a line passing through a center of the slide shaft and extending in the sliding direction, move integrally with the operation member, and capable of getting over a convex portion formed in the base member to generate a click force;

a plurality of armature portions configured to be movable integrally with the operation member and disposed in such a manner as to sandwich the click force generating portion in a direction of a width of the base member which is perpendicular to the sliding direction of the operation member; and a substrate configured to have signal patterns for detecting contact positions of the plurality of armature portions in the sliding direction, wherein the substrate is fixed to the base member such that a plurality of accommodation spaces between the substrate and the base member are provided, wherein the respective accommodation spaces are separated from each other, wherein the click force generating portion and the plurality of armature portions are accommodated in the plurality of accommodation spaces respectively such that the click force generating portion and the plurality of armature portions can move in the sliding direction.

14. The electronic apparatus according to claim 13, further comprising:

a click force generating member configured to be fixed to the operation member and have the click force generating portion formed therein; and an armature member configured to be fixed to the operation member and have the plurality of armature portions formed therein.

15. The electronic apparatus according to claim 13, wherein the click force generating portion and the plurality of armature portions are formed in the same member.

16. The electronic apparatus according to claim 13, further comprising a lubricant disposed between the click force generating portion and the convex portion.

* * * * *